Nov. 8, 1932.   M. GROSSMANN   1,887,126

DISTRIBUTOR FOR EXTRACTION APPARATUS

Filed May 28, 1930

Inventor:

Max Grossmann

Patented Nov. 8, 1932

1,887,126

UNITED STATES PATENT OFFICE

MAX GROSSMANN, OF JENA, GERMANY, ASSIGNOR TO THE FIRM OF JENAER GLASWERK SCHOTT & GEN., OF JENA, GERMANY

DISTRIBUTOR FOR EXTRACTION APPARATUS

Application filed May 28, 1930, Serial No. 456,611, and in Germany June 8, 1929.

Tubes of glass, quartz, or similar material, of which the lower end is inserted in a shallow vessel through a lid serving as a filter, whereby the tube is of the same material as the vessel and fused thereto, are already used in connection with extraction apparatus and serve the purpose of supplying and distributing gases or liquids. Although such tubes are not subject to a mechanical stress worth mentioning, it has proved, however, that, in the method hitherto chosen for fixing the tubes in the vessels, the breaking resistance is sometimes not sufficient for greater stresses in transport, during cleaning, etc.

According to the invention the breaking resistance is considerably increased in a simple way by introducing the tube through the lid of the vessel not only so far that, as hitherto, its lower end lies approximately flush with the interior surface of the lid, but to such an extent that the tube is in touch with the bottom of the vessel and held not only where it is fused to the filter but also at its lower end. When, at the same time, that part of the tube which is inside the vessel is provided with holes or the like allowing the passage of the substance to be distributed, an efficient distribution of the substance supplied by the tube is attained all the same. A specially high breaking resistance is obtained by fusing the lower tube end to the bottom of the vessel, in which case, naturally, the tube is necessarily made of the same material as the whole vessel.

Figure 1:
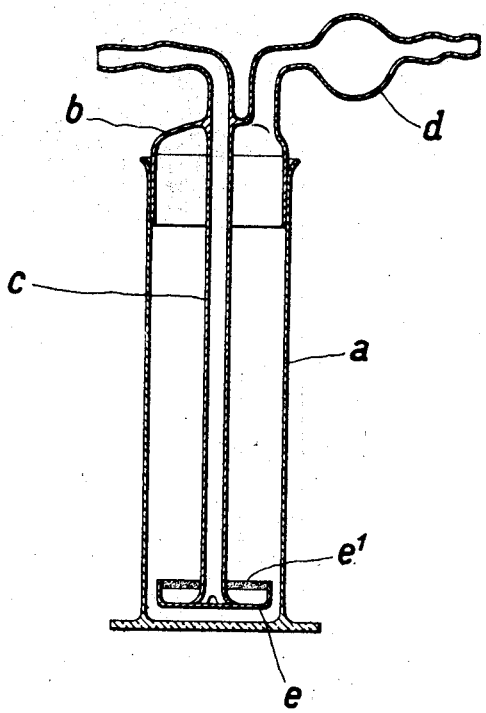
Figure 2:
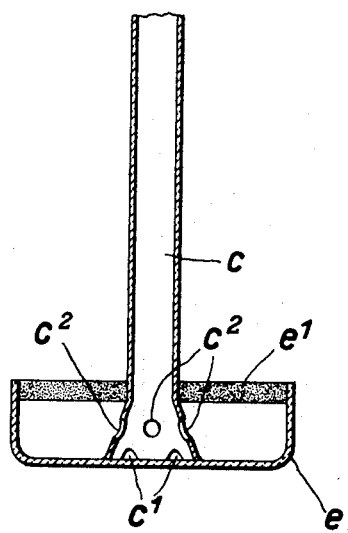

Of the accompanying drawing, which illustrates an example of the invention, Figure 1 shows the appliance in a longitudinal section, and Figure 2 a single part of Figure 1 on a larger scale.

The drawing represents a simple extraction apparatus, a so-called gas washer. This washer consists of a glass $a$ in which is inserted a stopper $b$ holding a distribution tube $c$ and a draining tube $d$. The lower end of the distribution tube $c$ is in a glass vessel $e$ having a lid of porous glass $e^1$ which serves as a filter (compare especially Figure 2). As can be seen in the drawing, the tube $c$ reaches down to the bottom of the vessel $e$. The tube $c$ is fused to the said bottom and, at the same time, to the filter $e^1$. In its lower end the tube $c$ is provided with grooves $c^1$ (Figure 2) and near the same with holes $c^2$ which allow the exit of a substance supplied by the tube.

When in use, the glass $a$ is filled approximately half way up with a liquid and by means of this liquid a certain constituent is extracted from the gas mixture or a mixture of gas and aqueous vapour. The gas mixture is introduced through the tube $c$ and arrives in the vessel $e$. From here it passes through the pores of the filter $e^1$ into the extraction liquid where it is distributed in the form of many fine bubbles. In this finely distributed condition the gas mixture rises in the liquid and enriches the same to a certain extent. In this way, by means of water, ammonia can be extracted from a mixture of ammonia and air, or, by means of concentrated sulphuric acid, aqueous vapour from a mixture of aqueous vapor and air, etc.

I claim:

1. Distributor for extraction apparatus, comprising a shallow vessel, a lid intimately connected with the said vessel, the lid being a filter of glass or similar material, and a tube of the same material as the filter, the tube going down to the bottom of the vessel and being fused to the filter, that part of the tube which is inside the said vessel being provided with apertures.

2. Distributor for extraction apparatus, comprising a shallow vessel of glass or similar material, a lid of which the rim is fused to the vessel, the lid being a filter of the same material as the vessel, and a tube being likewise of the same material and going down to the bottom of the vessel and being fused to the said bottom as well as to the filter, that part of the tube which is inside the said vessel being provided with apertures.

MAX GROSSMANN.